United States Patent
Chung et al.

(10) Patent No.: US 9,606,638 B2
(45) Date of Patent: Mar. 28, 2017

(54) MULTIMEDIA DEVICE AND METHOD OF CONTROLLING A CURSOR THEREOF

(71) Applicant: LG ELECTRONICS INC., Seoul (KR)

(72) Inventors: Wooseong Chung, Seoul (KR); Byungtae Choi, Seoul (KR); Chongsok Kim, Seoul (KR); Seoksoo Lee, Seoul (KR); Woonghyeon Kim, Seoul (KR); Jaehan Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 14/614,648

(22) Filed: Feb. 5, 2015

(65) Prior Publication Data

US 2015/0293609 A1    Oct. 15, 2015

(30) Foreign Application Priority Data

Apr. 14, 2014    (KR) .................. 10-2014-0044207

(51) Int. Cl.
*G06F 3/033*    (2013.01)
*H04N 5/445*    (2011.01)
(Continued)

(52) U.S. Cl.
CPC .......... *G06F 3/033* (2013.01); *G06F 3/04892* (2013.01); *H04N 5/44513* (2013.01); *H04N 7/088* (2013.01); *H04N 2005/4428* (2013.01)

(58) Field of Classification Search
CPC .......... G06F 3/03–3/0308; G06F 3/033; G06F 3/0354; G06F 3/03542; G06F 3/038–3/0386; G06F 3/048–3/0483; G06F 3/04892; G06F 2203/04801; G09G 5/36; G09G 5/37–5/377; G09G 5/38; G09G 5/39; G09G 5/395–5/399; G09G 2340/12; G09G 2340/125; G06T 5/50; G06T 11/60; G06T 2207/20212; G06T 2207/20221;
(Continued)

(56) References Cited

U.S. PATENT DOCUMENTS

| | | | |
|---|---|---|---|
| 2003/0234891 A1* | 12/2003 | Nio | ........................ G09G 5/008 348/473 |
| 2005/0264525 A1* | 12/2005 | Adams | .................. G06F 3/0304 345/156 |
| 2010/0262993 A1 | 10/2010 | Mizuno | |

FOREIGN PATENT DOCUMENTS

| | | |
|---|---|---|
| EP | 0 414 565 A2 | 8/1990 |
| EP | 1 150 507 A2 | 3/2001 |
| EP | 2 667 627 A2 | 2/2013 |

OTHER PUBLICATIONS

European Search Report issued in Application No. 14004285.4 dated Jun. 25, 2015.

* cited by examiner

*Primary Examiner* — Nathan Danielsen
(74) *Attorney, Agent, or Firm* — KED & Associates LLP

(57) ABSTRACT

A multimedia device and method of controlling a cursor thereof are disclosed, by which a frequency of the cursor can be increased without system extension. The present invention includes receiving a cursor display signal from an input device, generating a location information of a cursor and an image information of the cursor in accordance with the received cursor display signal, embedding the generated location information of the cursor in the video signal, and displaying the image information of the cursor based on the location information of the cursor embedded in the video signal.

17 Claims, 12 Drawing Sheets

(51) Int. Cl.
*H04N 7/088* (2006.01)
*G06F 3/0489* (2013.01)
*H04N 5/44* (2011.01)

(58) Field of Classification Search
CPC .... H04N 5/44; H04N 5/4403; H04N 5/44513; H04N 2005/4405; H04N 2005/4428; H04N 2005/44517–2005/44539
See application file for complete search history.

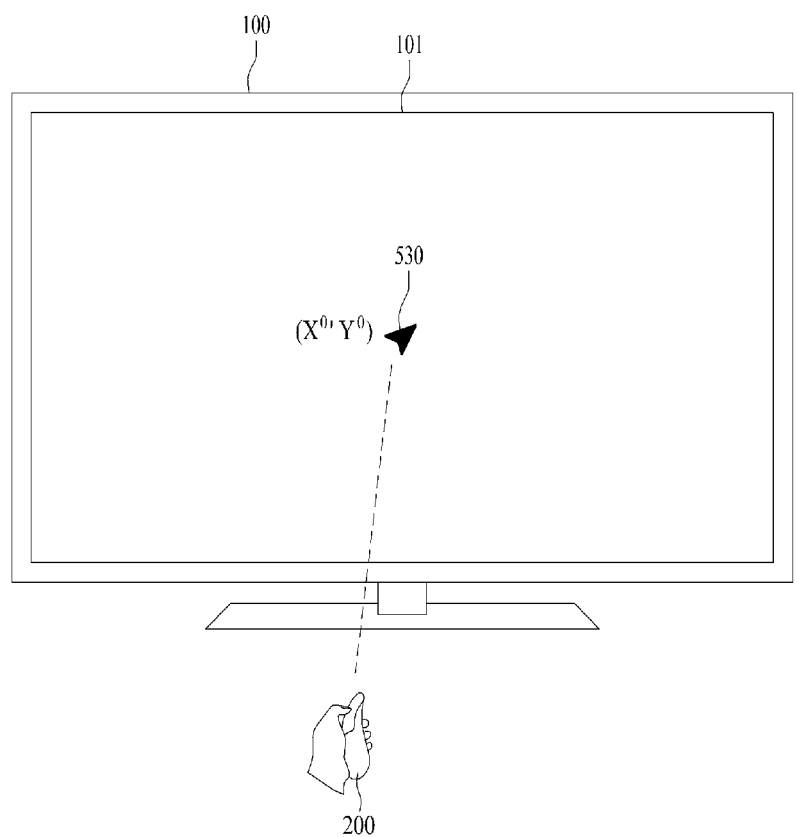

MULTIMEDIA DEVICE AND METHOD OF CONTROLLING A CURSOR THEREOF

Pursuant to 35 U.S.C. §119(a), this application claims the benefit of earlier filing date and right of priority to Korean Application No. 10-2014-0044207, filed on Apr. 14, 2014, the contents of which are hereby incorporated by reference herein in their entirety.

BACKGROUND OF THE INVENTION

Field of the Invention

The present invention relates to a multimedia device, and more particularly, to a multimedia device and method of controlling a cursor thereof. Although the present invention is suitable for a wide scope of applications, it is particularly suitable for increasing a frequency of the cursor without system extension.

Discussion of the Related Art

Generally, a multimedia device is equipped with a function of receiving and processing a user-viewable broadcast image.

And, the multimedia device can display a broadcast selected by a user from broadcast signals transmitted from a broadcasting station.

Recently, analog broadcasting tends to be replaced by digital broadcasting in many countries.

The digital broadcasting means the broadcasting of transmitting digital video and audio signals. Since the digital broadcasting is stronger against external noise than the analog broadcasting, the digital broadcasting has data loss less than that of the analog broadcasting. The digital broadcasting is more advantageous than the analog broadcasting in error correction. The digital broadcasting has resolution higher than that of the analog broadcasting. And, the digital broadcasting provides a screen image clearer than that of the analog broadcasting.

Moreover, the digital broadcasting is capable of interactive services unlike the analog broadcasting.

In order to comply with digital broadcasting, a recent multimedia device provides performance higher than that of an existing multimedia device and is more multi-functional than the existing multimedia device. And, such services available for a multimedia device as an internet service, VOD (video on demand), an electronic album service and the like are diversified.

Therefore, a user uses a remote control device to facilitate an operation of a multimedia device capable of providing various functions and services in a remote distance.

In this case, the remote control device controls a cursor to be displayed on a screen of the multimedia device, thereby operating the multimedia device in a remote distance by Infrared-ray Communication and the like.

Yet, as a screen size of a multimedia device tends to become larger, the demand for increasing a frequency of a cursor is rising.

Namely, if a frequency of a cursor fails to increase in response to a screen size of a multimedia device, the cursor displayed on a screen fails to moves naturally and smoothly so as to cause inconvenience to a user.

However, in order to increase a frequency of a cursor, a system should be reconfigured by hardware to cause problems (e.g., cost rise, system complexity increase, etc.).

Thus, the demand for developing a multimedia device capable of increasing a frequency of a cursor without system reconfiguration or extension is considerably rising.

SUMMARY OF THE INVENTION

Accordingly, embodiments of the present invention are directed to a multimedia device and method of controlling a cursor thereof that substantially obviate one or more problems due to limitations and disadvantages of the related art.

An object of the present invention is to provide a multimedia device and method of controlling a cursor thereof, by which user convenience can be enhanced with cost increase in a manner of increasing a frequency of a cursor without system reconfiguration or extension.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a method of controlling a cursor of a multimedia device in displaying a video including OSD data by mixing a video signal and an OSD signal together according to one embodiment of the present invention may include the steps of receiving a cursor display signal from an input device, generating a location information of a cursor and an image information of the cursor in accordance with the received cursor display signal, embedding the generated location information of the cursor in the video signal, and displaying the image information of the cursor based on the location information of the cursor embedded in the video signal.

Preferably, in the step of embedding the generated location information of the cursor in the video signal, the generated image information of the cursor may be embedded in either the video signal or the OSD signal.

Preferably, the location information of the cursor may be embedded in a vertical blanking interval of the video signal.

In another aspect of the present invention, as embodied and broadly described herein, in displaying a video including OSD data by mixing a video signal and an OSD signal together, a multimedia device according to one embodiment of the present invention includes a receiving unit configured to receive a cursor display signal from an input device, a cursor generating unit configured to generate a location information of a cursor and an image information of the cursor in accordance with the received cursor display signal, a control unit configured to control the generated location information of the cursor to be transmitted in a manner of being embedded in the video signal, and a display unit configured to display the image information of the cursor based on the location information of the cursor embedded in the video signal.

Preferably, the cursor generating unit may include a cursor information extracting unit, if the cursor display signal is received, extracting basic values preset for a location and image of the cursor, a cursor location calculating unit, if a value of the received cursor display signal is changed, calculating a location value of the cursor corresponding to the changed cursor display signal value, and a transmitting unit transmitting the location information on the calculated location value of the cursor and the image information on the extracted basic value of the image in response to a control signal of the control unit.

Accordingly, the present invention provides the following effects and/or advantages.

First of all, according to one embodiment of the present invention, user convenience can be enhanced without a cost rise in a manner of increasing a frequency of a cursor without system reconfiguration or extension.

Secondly, the present invention provides to a cursor displayed on a wide screen with natural and smooth movement, thereby fitting to a multimedia device having a wide screen.

Effects or advantages obtainable from the present invention may be non-limited by the above mentioned effect. And, other unmentioned effects can be clearly understood from the following description by those having ordinary skill in the technical field to which the present invention pertains. It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. The above and other aspects, features, and advantages of the present invention will become more apparent upon consideration of the following description of preferred embodiments, taken in conjunction with the accompanying drawing figures. In the drawings:

FIG. 8A and FIG. 8B are diagrams to illustrate movements of a cursor displayed on a display screen;

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, a multimedia device described in the present specification is an intelligent multimedia device having a computer supportive function added to a broadcast receiving function. In particular, the multimedia device fully supports a broadcast receiving function and has an internet function and the like added thereto. Hence, the multimedia device can have such a facilitated interface as a handwritten input device, a touchscreen, a space remote control device and the like.

And, the multimedia device is connected to internet and computer with the support of wired/wireless internet function and can perform functions of email, web browsing, banking, game and the like. For the various functions, a standardized universal operation system (OS) can be used.

Since various applications can be freely added to or deleted from a universal OS kernel, a multimedia device mentioned in the description of the present invention can perform various kinds of user-friendly functions.

Moreover, a multimedia device may include one of a network TV, an HBBTV, a smart TV and the like for example and is applicable to a smartphone in some cases.

Figure 1:
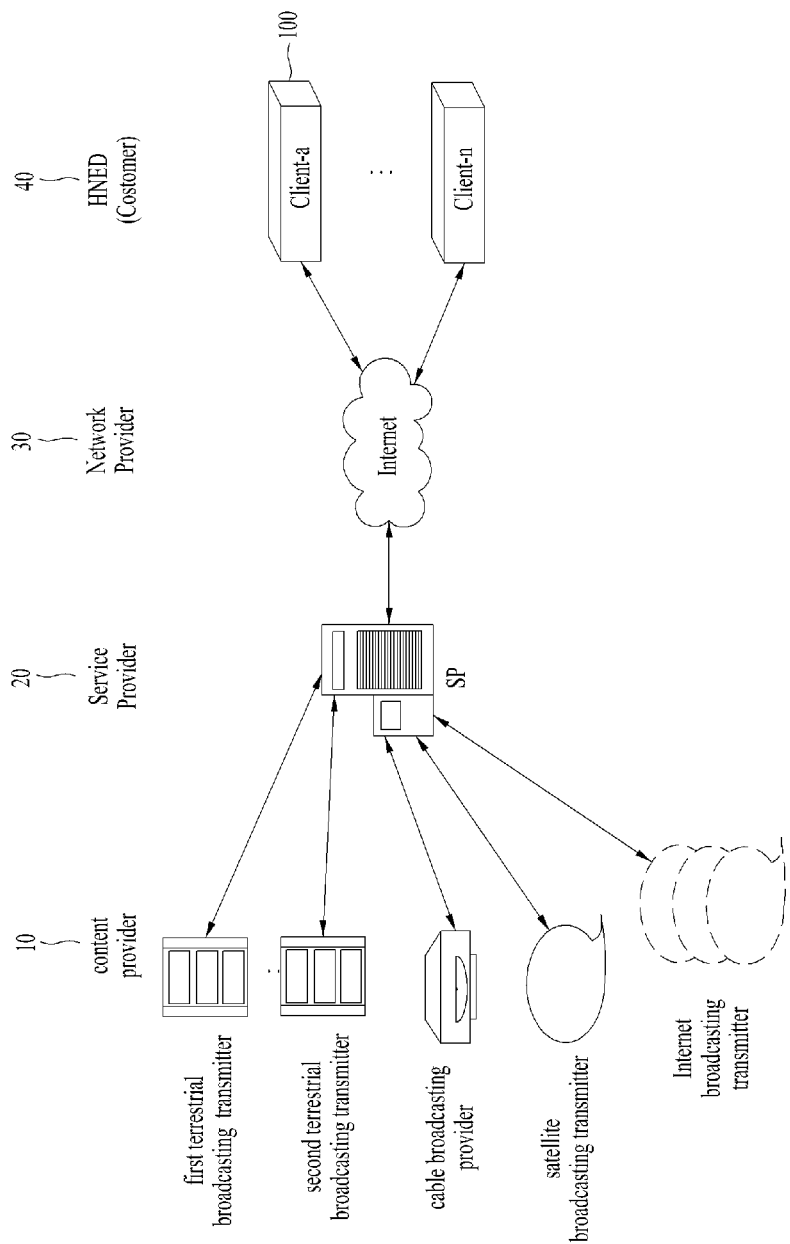
FIG. 1 is a schematic diagram of a broadcast system including a multimedia device according to the present invention.

FIG. 1 is a schematic diagram of a broadcast system including a multimedia device according to the present invention.

Referring to FIG. 1, examples of a broadcast system comprising a digital receiver may include a content provider (CP) 10, a service provider (SP) 20, a network provider (NP) 30, and a home network end user (FINED) (Customer) 40. The FINED 40 includes a client 100, that is, a digital receiver.

Each of the CP 10, SP 20 and NP 30, or a combination thereof may be referred to as a server. The FINED 40 can also function as a server. The term 'server' means an entity that transmits data to another entity in a digital broadcast environment. Considering a server-client concept, the server can be regarded as an absolute concept and a relative concept. For example, one entity can be a server in a relationship with a first entity and can be a client in a relationship with a second entity.

The CP 10 is an entity that produces content. Referring to FIG. 1, the CP 10 can include a 1st or 2nd terrestrial broadcaster, a cable system operator (SO), a multiple system operator (MSO), a satellite broadcaster, various Internet broadcasters, private content providers (CPs), etc. The content can include applications as well as broadcast content.

The SP 20 packetizes content provided by the CP 10. Referring to FIG. 1, the SP 20 packetizes content provided by the CP 10 into one or more services available for users.

The SP 20 can provide services to the client 100 in a uni-cast or multi-cast manner.

The CP 10 and the SP 20 can be configured in the form of one entity. For example, the CP 10 can function as the SP 20 by producing content and directly packetizing the produced content into services, and vice versa.

The NP 30 can provide a network environment for data exchange between the server 10 and/or 20 and the client 100. The NP 30 supports wired/wireless communication protocols and constructs environments therefore. In addition, the NP 30 can provide a cloud environment.

The client 100 can construct a home network and transmit/receive data.

The server can use and request a content protection means such as conditional access. In this case, the client 100 can use a means such as a cable card or downloadable CAS (DCAS), which corresponds to the content protection means of the server.

In addition, the client 100 can use an interactive service through a network. In this case, the client 100 can directly serve as the CP 10 and/or the SP 20 in a relationship with another client or indirectly function as a server of the other client.

Figure 2:
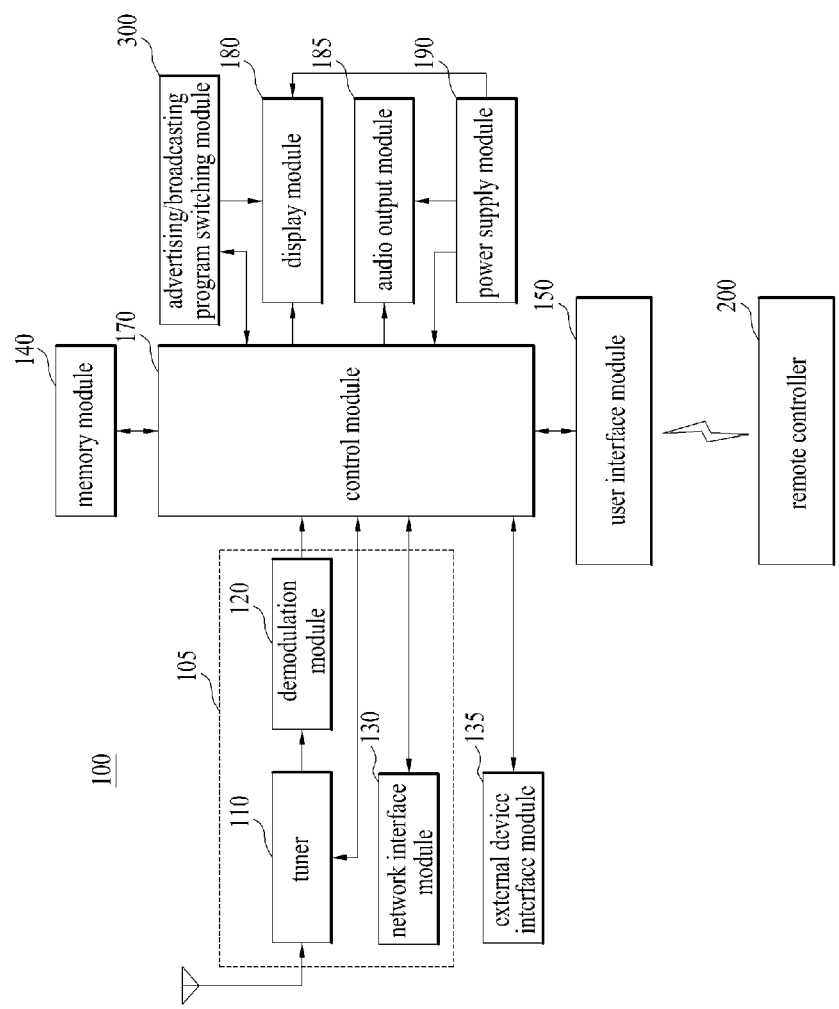
FIG. 2 is a block diagram of the multimedia device shown in FIG. 1.

FIG. 2 is a block diagram of the multimedia device shown in FIG. 1.

Referring to FIG. 2, an exemplary multimedia device 100 according to the present invention may include a broadcast receiving unit 105, an external device interface 135, a storage unit 140, a user input interface 150, a controller 170, a display unit 180, an audio output unit 185, a power supply unit 190, and a photographing unit (not shown). The broadcast receiving unit 105 may include at least one of one or more tuner 110, a demodulator 120, and a network interface 130. The broadcast receiving unit 105 may include the tuner 110 and the demodulator 120 without the network interface 130, or may include the network interface 130 without the tuner 110 and the demodulator 120. The broadcast receiving unit 105 may include a multiplexer (not shown) to multiplex a signal, which is subjected to the tuner 110 and demodulated by the demodulator 120, and a signal received through the network interface 130. In addition, the broadcast receiving unit 105 can include a demultiplexer (not shown) and demultiplex a multiplexed signal, a demodulated signal, or a signal received through the network interface 130.

The tuner 110 may receive a radio frequency (RF) broadcast signal by tuning to a channel selected by the user from among RF broadcast signals received through an antenna or all previously stored channels.

The demodulator 120 may receive a digital IF (Intermediate Frequency) signal (DIF) converted by the tuner 110 and demodulate the DIF signal.

A stream signal output from the demodulator 120 may be input to the controller 170. The controller 170 can control demultiplexing, audio/video signal processing, etc. Furthermore, the controller 170 can control output of an image through the display unit 180 and output of audio through the audio output unit 185.

The external device interface 135 may provide an environment for interfacing external devices with the multimedia device 100. To implement this, the external device interface 135 may include an A/V input/output unit (not shown) or an RF communication unit (not shown).

The external device interface 135 can be connected with external devices such as a digital versatile disk (DVD), a Blu-ray player, a game device, a camera, a camcorder, a computer (notebook computer), a Cloud and a mobile device (e.g., a Smart Phone, a tablet PC, and the like) in a wired/wireless manner.

The A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The RF communication unit can perform near field communication. The multimedia device 100 can be networked with other electronic apparatuses according to communication protocols such as Bluetooth, radio frequency identification (RFID), infrared data association (IrDA), ultra wideband (UWB), ZigBee, and digital living network alliance (DLNA), for example.

The network interface 130 may provide an interface for connecting the digital receiver 400 to wired/wireless networks.

Using the network interface 130, the digital receiver can transmit/receive data to/from other users or other electronic apparatuses or access a predetermined web page through a network connected thereto or another network linked to the connected network.

The network interface 130 can selectively receive a desired application from among publicly open applications through a network.

The storage unit 140 may store programs for signal processing and control and store a processed video, audio or data signal.

In addition, the storage unit 140 may execute a function of temporarily storing a video, audio or data signal input from the external device interface 135 or the network interface 130. The storage unit 140 may store information about a predetermined broadcast channel through a channel memory function.

The storage unit 140 can store an application or a list of applications input from the external device interface 135 or the network interface 130. The storage unit 140 may store various platforms which will be described later. The storage unit 140 can include storage media of one or more types, such as a flash memory type, a hard disk type, a multimedia card micro type, a card type memory (e.g. SD or XD memory), RAM, EEPROM, etc. The multimedia device 100 may reproduce content files (a video file, a still image file, a music file, a text file, an application file, etc.) and provide them to the user.

While FIG. 2 illustrates an embodiment in which the storage unit 140 is separated from the controller 170, the configuration of the multimedia device 100 is not limited thereto and the storage unit 140 may be included in the controller 170.

The user input interface 150 may transmit a signal input by the user to the controller 170 or deliver a signal output from the controller 170 to the user.

For example, the user input interface 150 can receive control signals such as a power on/off signal, a channel selection signal, an image setting signal, etc. from the remote controller 200 or transmit control signals of the controller 170 to the remote controller 200 according to various communication schemes such as RF communication, IR communication, and the like.

The user input interface 150 can transmit control signals input through a power key, a channel key, a volume key, and a local key (not shown) of a set value to the controller 170.

The user input interface 150 can transmit a control signal input from a sensing unit (not shown) which senses a gesture of the user or deliver a signal of the controller 170 to the sensing unit (not shown). Here, the sensing unit (not shown) may include a touch sensor, a voice sensor, a position sensor, an action sensor, an acceleration sensor, a gyro sensor, a speed sensor, a tilt sensor, a temperature sensor, a pressure or back-pressure sensor, etc.

The controller 170 can generate and output a signal for video or audio output by demultiplexing streams input through the tuner 110, the demodulator 120 or the external device interface 435 or processing demultiplexed signals.

A video signal processed by the controller 170 can be input to the display unit 180 and displayed as an image through the display unit 180. In addition, the video signal processed by the controller 170 can be input to an external output device through the external device interface 135.

An audio signal processed by the controller 170 can be applied to the audio output unit 185. Otherwise, the audio signal processed by the controller 170 can be applied to an external output device through the external device interface 135.

The controller 170 may include a demultiplexer and an image processor, which are not shown in FIG. 2.

The controller 170 can control the overall operation of the multimedia device 100. For example, the controller 170 can control the tuner 110 to tune to an RF broadcast corresponding to a channel selected by the user or a previously stored channel.

The controller 170 can control the multimedia device 100 according to a user command input through the user input interface 150 or an internal program. Particularly, the controller 170 can control the multimedia device 100 to be linked to a network to download an application or application list that the user desires to the multimedia device 100.

For example, the controller 170 may control the tuner 110 to receive a signal of a channel selected in response to a predetermined channel selection command received through the user input interface 150. In addition, the controller 170 may process a video, audio or data signal corresponding to the selected channel. The controller 170 may control information on a channel selected by the user to be output with a processed video or audio signal through the display unit 180 or the audio output unit 185.

Alternatively, the controller 170 may control a video signal or an audio signal received from an external apparatus, for example, a camera or a camcorder through the external device interface 135 to be output through the display unit 180 or the audio output unit 185 according to an external device image reproduction command received through the user input interface 150.

The controller 170 can control the display unit 180 to display images. For example, the controller 170 can control a broadcast image input through the tuner 110, an external input image received through the external device interface 135, an image input through the network interface 130, or an image stored in the storage unit 140 to be displayed on the display unit 180. Here, an image displayed on the display unit 180 can be a still image or video, and it can be a 2D or 3D image.

The controller 170 can control reproduction of content. Here, the content may be content stored in the multimedia device 100, received broadcast content, or content input from an external device. The content may include at least one of a broadcast image, an external input image, an audio file, a still image, an image of a linked web, and a text file.

The controller 170 can control display of applications or an application list, downloadable from the multimedia device 100 or an external network, when an application view menu is selected.

The controller 170 can control installation and execution of applications downloaded from an external network in addition to various user interfaces. Furthermore, the controller 170 can control an image relating to an application executed by user selection to be displayed on the display unit 180.

The multimedia device 100 may further include a channel browsing processor (not shown) which generates a thumbnail image corresponding to a channel signal or an external input signal.

The channel browsing processor can receive a stream signal (e.g., TS) output from the demodulator 120 or a stream signal output from the external device interface 135 and extract an image from the received stream signal to generate a thumbnail image. The generated thumbnail image can be directly input to the controller 170 or can be encoded and then input to the controller 170. Also, the thumbnail image can be coded into a stream and then applied to the controller 170. The controller 170 can display a thumbnail list including a plurality of thumbnail images on the display unit 180 using thumbnail images input thereto. The thumbnail images included in the thumbnail list can be updated sequentially or simultaneously. Accordingly, the user can conveniently check content of a plurality of broadcast channels.

The display unit 180 may convert a video signal, a data signal, and an OSD signal processed by the controller 170 and a video signal and a data signal received from the external device interface 135 into RGB signals to generate driving signals. The display unit 480 may be a PDP, an LCD, an OLED, a flexible display, a 3D display or the like. The display unit 180 may be configured as a touch-screen and used as an input device rather than an output device. The audio output unit 185 receives a signal audio-processed by the controller 170, for example, a stereo signal, a 3.1 channel signal or a 5.1 channel signal, and outputs the received signal as audio. The audio output unit 185 can be configured as one of various speakers.

The multimedia device 100 may further include the sensing unit (not shown) for sensing a gesture of the user, which includes at least one of a touch sensor, a voice sensor, a position sensor, and an action sensor, as described above. A signal sensed by the sensing unit (not shown) can be delivered to the controller 170 through the user input interface 150. The multimedia device 100 may further include the photographing unit (not shown) for photographing the user. Image information acquired by the photographing unit (not shown) can be supplied to the controller 170. The controller 170 may sense a gesture of the user from an image captured by the photographing unit (not shown) or a signal sensed by the sensing unit (not shown), or by combining the image and the signal.

The power supply unit 190 may supply power to the multimedia device 100. Particularly, the power supply unit 190 can supply power to the controller 170 which can be implemented as a system-on-chip (SoC), the display unit 180 for displaying images, and the audio output unit 185 for audio output.

The remote controller 200 may transmit user input to the user input interface 150. To achieve this, the remote controller 200 can use Bluetooth, RF communication, IR communication, UWB, ZigBee, etc. In addition, the remote controller 200 can receive audio, video or data signal output from the user input interface 150 and display the received signal or output the same as audio or vibration.

The multimedia device is an example of image signal processors which process an image stored therein or an input image. Other examples of the image signal processors may include a set-top box (STB) which does not include the display unit 180 and the audio output unit 185 shown in FIG. 2, a DVD player, a Blu-ray player, a game device, a computer, etc.

Figure 3:
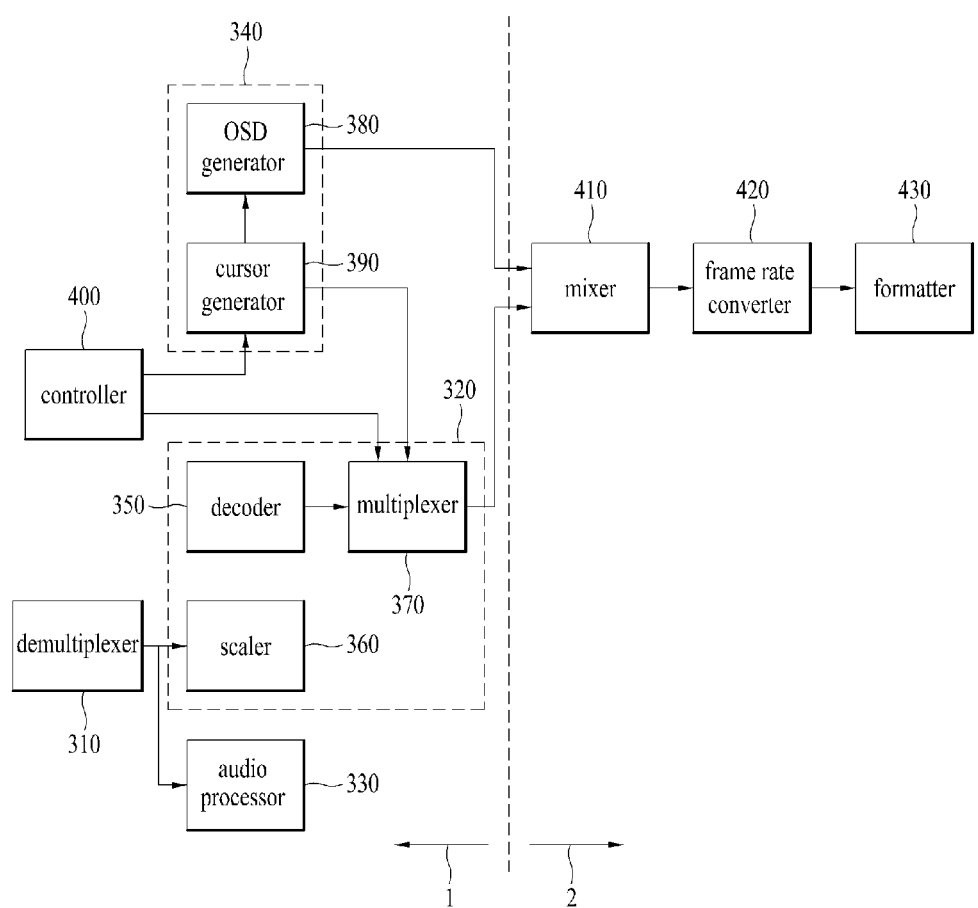
FIG. 3 is a block diagram of a control unit shown in FIG. 2.

FIG. 3 is a block diagram of a control unit shown in FIG. 2.

Referring to FIG. 3, a control unit of the present invention may primarily include a preprocessing unit 1 and a postprocessing unit 2.

In particular, the preprocessing unit 1 may include a main SOC (System on Chip) of a multimedia device and the postprocessing unit 2 may include an FRC (Frame Rate Conversion) chip of the multimedia device, by which the present invention is non-limited.

For instance, the postprocessing unit 1 may include a demultiplexer 310, a video processor 320, an audio processor 330, an OSD processor 340, a controller 400 and the like, which may be removed in part in accordance with design.

The video processor 320 may include a decoder 350, a scaler 360 and a multiplexer 320. And, the OSD processor 340 may include a cursor generator 390 and an OSD generator 380.

The postprocessing unit 2 may include a mixer 410, a frame rate converter 420 and a formatter 430, which may be removed in part in accordance with design.

According to the above-mentioned configuration, the demultiplexer 310 may demultiplex an inputted stream (e.g., TS, etc.). The video processor 320 may perform a video processing on a demultiplexed video signal.

The decoder 350 of the video processor 320 decodes a demultiplexed video signal and the scaler 360 performs a scaling to enable resolution of the decoded video signal to be outputtable from a display module.

And, the audio processor 330 processes a demultiplexed audio data into a signal outputtable through a speaker.

The OSD generator 380 of the OSD processor 340 can generate an OSD signal in response to a user input or by itself.

For instance, the OSD generator 380 can generate a signal for displaying various information as graphics or texts on a screen of the display module based on a control signal from a user interface unit or automatically.

If a cursor display signal is received from a remote control device through the user interface, the cursor generator 390 of the OSD processor 340 can generate a location information of a cursor and an image information of the cursor in accordance with the received cursor display signal.

In this case, the cursor generator 390 can transmit the generated location information of the cursor and the generated image information of the cursor through a first path, on which a video signal is transmitted, in accordance with a control signal of the controller 400 by transmitting them to the multiplexer 370 of the video processor 320.

In particular, the location information of the cursor and the image information of the cursor can be transmitted through to the first path in a manner of being embedded in the video signal.

In some cases, in accordance with a control signal of the controller 400, the cursor generator 390 can transmit the generated location information of the cursor through the first path, on which a video signal is transmitted, by transmitting it to the multiplexer 370 of the video processor 320 and is also able to transmit the generated image information of the cursor through a second path, on which an OSD signal is transmitted, by transmitting it to the OSD generator 380 of the OSD processor 340.

In particular, the location information of the cursor can be transmitted through the first path in a manner of being embedded in the video signal and the image information of the cursor can be transmitted through the second path in a manner of being embedded in the OSD signal.

In other cases, the cursor generator 390 can transmit the generated location information of the cursor and the generated image information of the cursor through the second path, on which the OSD signal is transmitted, in accordance with a control signal of the controller 400 by transmitting them to the OSD generator 380 of the OSD processor 340.

In particular, the location information of the cursor and the image information of the cursor can be transmitted through the second path in a manner of being embedded in the OSD signal.

The cursor generator 390 may include a cursor information extractor, a cursor location calculator and a transmitter.

In this case, if the cursor display signal is received, the cursor information extractor can extract basic values for a preset location and image of a cursor from a storage unit in accordance with a control signal of the controller 400.

In particular, the basic value for the preset location of the cursor may include a value located at a center of a screen on which a video is displayed.

Subsequently, if a received cursor display signal value is changed, the cursor location calculator can calculate a location value of the cursor corresponding to the changed cursor display signal value.

In this case, the cursor display signal value may include a size value of amount of light incident from the remote control device or a value of coordinates (X, Y) for a light image.

Subsequently, the transmitter transmits a location information on the calculated location value of the cursor and an image information on the extracted basic value of the image to the multiplexer 370 of the video processor 320 in accordance with a control signal of the controller 400, thereby transmitting them through the first path on which the video signal is transmitted.

In some cases, in accordance with a control signal of the controller 400, the transmitter can transmit the generated location information of the cursor through the first path, on which a video signal is transmitted, by transmitting it to the multiplexer 370 of the video processor 320 and is also able to transmit the generated image information of the cursor through a second path, on which an OSD signal is transmitted, by transmitting it to the OSD generator 380 of the OSD processor 340.

In other cases, the transmitter can transmit the generated location information of the cursor and the generated image information of the cursor through the second path, on which the OSD signal is transmitted, in accordance with a control signal of the controller 400 by transmitting them to the OSD generator 380 of the OSD processor 340.

Hence, the OSD generator 340 can transmit at least one of the location information of the cursor and the image information of the cursor, which are transmitted from the cursor generator 390, to the postprocessing unit 2 through the second path for transmitting the OSD signal.

Subsequently, the multiplexer 370 of the video processor 320 can transmit at least one of the location information of the cursor and the image information of the cursor, which are transmitted from the cursor generator 390, to the postprocessing unit 2 through the first path for transmitting the video signal.

In doing so, in accordance with a control signal of the controller 400, the multiplexer 370 can transmit at least one of the location information of the cursor and the image information of the cursor in a vertical blanking interval of the video signal.

In this case, the location and image informations of the cursor transmitted through the first path can be transmitted at the same frequency of the video signal transmitted through the first path.

For instance, the transmission frequency of the location and image informations of the cursor transmitted through the first path may be higher than that of the OSD signal transmitted through the second path.

In particular, the transmission frequency of the location and image informations of the cursor transmitted through the first path may be about 1.1~2 times higher than that of the OSD signal transmitted through the second path.

The controller 400 can control the cursor generator 390 and the multiplexer 370 in accordance with a transmission mode.

In this case, the transmission mode may be set to default in advance or may be set in response to an additional information size transmitted in the vertical blanking interval of the video signal.

For instance, if the transmission mode is preset, the controller 400 can control the cursor generator 390 and the multiplexer 370 in accordance with the preset transmission mode.

In this case, if the transmission mode is set to a first mode, the controller 400 can control the cursor generator 390 and the multiplexer 370 so that the location information of the cursor and the image information of the cursor can be transmitted through the first path on which the video signal is transmitted.

In some cases, if the transmission mode is set to a second mode, the controller 40 can control the cursor generator 390 and the multiplexer 370 so that the location of the cursor and the image information of the cursor can be transmitted through the first path, on which the video signal is transmitted, and the second path, on which the OSD signal is transmitted, respectively.

In other cases, if the transmission mode is set to a third mode, the controller 400 can control the cursor generator 390 and the multiplexer 370 so that the location information of the cursor and the image information of the cursor can be transmitted through the second path on which the OSD signal is transmitted.

Moreover, the controller 400 checks an additional information size transmitted in the vertical blanking interval of the video signal. If the controller 400 determines that the additional information size is smaller than a first reference size, the controller 400 sets the transmission mode to the first mode. If the controller 400 determines that the additional information size is greater than the first reference size but smaller than a second reference size, the controller 400 sets the transmission mode to the second mode. If the controller 400 determines that the additional information size is greater than the second reference size, the controller 180 can set the transmission mode to the third mode.

Meanwhile, the mixer 410 of the postprocessing unit 2 mixes the OSD signal generated from the OSD generator 380 and the video signal decoded by the video processor 320 with each other.

Hence, broadcast data and various OSD graphics can be displayed in a manner overlaying one another simultaneously.

Subsequently, the frame rate converter (FRC) 420 of the postprocessing unit 2 can convert a frame rate of an inputted video.

For instance, the frame rate converter 420 can convert a frame rate to 120 or 240 Hz from 60 Hz. In case that the frame rate of 60 Hz is converted to 120 Hz, it is possible to insert a first frame between the first frame and a second frame or insert a third frame, which is predicted from the first frame and the second frame, between the first frame and the second frame.

In case of converting a frame rate of 60 Hz to 240 Hz, it is possible to insert 3 frames of the same or 3 predicted frames.

Meanwhile, it is possible to maintain an inputted frame rate without separate conversion.

Subsequently, the formatter 430 of the postprocessing unit 2 receives an input of an output signal of the frame rate converter 420 and is then able to change a format outputtable from the display module.

For instance, the formatter 430 can output R/G/B data signal. In this case, the R/G/B data signal may be outputted as low voltage differential signaling (LVDS) or mini-LVDS.

Thus, the present invention increases a frequency of a cursor without system change or extension, thereby providing user convenience without a cost rise.

Figure 4:
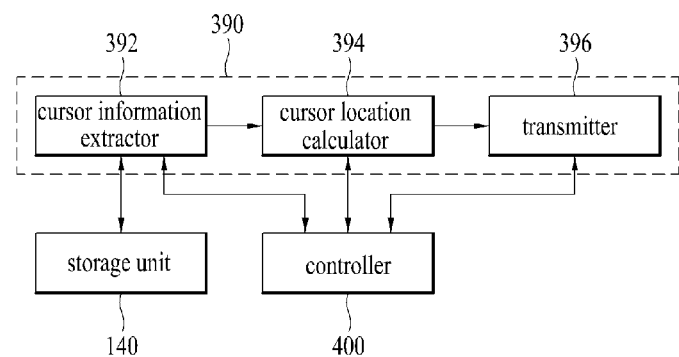
FIG. 4 is a block diagram of a cursor generator shown in FIG. 3.

FIG. 4 is a block diagram of the cursor generator shown in FIG. 3.

Referring to FIG. 4, the cursor generator 390 may include a cursor information extractor 392, a cursor location calculator 394 and a transmitter 396.

In this case, if a cursor display signal is received, the cursor information extractor 392 can extract basic values for a preset location and image of a cursor from the storage unit 140 in accordance with a control signal of the controller 400.

In particular, the basic value for the preset location of the cursor may include a value located at a center of a screen on which a video is displayed.

Hence, if the cursor display signal is initially received, a preset image of the cursor can be displayed on a central region of the screen.

Subsequently, if a received cursor display signal value is changed, the cursor location calculator 394 can calculate a location value of the cursor corresponding to the changed cursor display signal value.

In this case, the cursor display signal value may include a size value of amount of light incident from the remote control device or a value of coordinates (X, Y) for a light image.

In particular, if at least one of the value of the coordinates (X, Y) for the light image corresponding to the cursor display signal and the size value of amount of light is changed, the controller 400 can calculate a location value of the cursor corresponding to the changed value.

Subsequently, the transmitter 396 can transmit a location information on the calculated location value of the cursor and an image information on the extracted basic value of the image to the multiplexer of the video processor in accordance with a control signal of the controller 400, thereby transmitting them through the first path on which the video signal is transmitted.

In this case, the location and image informations of the cursor transmitted through the first path can be transmitted at the same frequency of the video signal transmitted through the first path.

For instance, the transmission frequency of the location and image informations of the cursor transmitted through the first path may be higher than that of the OSD signal transmitted through the second path.

In particular, the transmission frequency of the location and image informations of the cursor transmitted through the first path may be about 1.1~2 times higher than that of the OSD signal transmitted through the second path.

In some cases, the transmitter 396 transmits the generated location information of the cursor to the multiplexer of the video processor in accordance with a control signal of the controller 400 so that the location information can be transmitted through the first path on which the video signal is transmitted. And, the transmitter 396 transmits the generated image information of the cursor to the OSD generator of the OSD processor in accordance with a control signal of the controller 400 so that the image information can be transmitted through the second path on which the OSD signal is transmitted.

In this case, the location information of the cursor transmitted through the first path can be transmitted in the vertical blanking interval of the video signal.

In doing so, the location information of the cursor transmitted on the first path may be transmitted at a first frequency and the image information of the cursor transmitted on the second path may be transmitted at a second frequency lower than the first frequency.

For instance, the first frequency may be about 1.1~2 times higher than the second frequency.

In other cases, the transmitter 396 transmits the generated location information of the cursor and the generated image information of the cursor to the ISD generator of the OSD processor in accordance with a control signal of the controller 400, thereby transmitting them through the second path on which the OSD signal is transmitted.

Thus, the present invention increases a frequency of a cursor without system change or extension, thereby providing user convenience without a cost rise.

Figure 5:
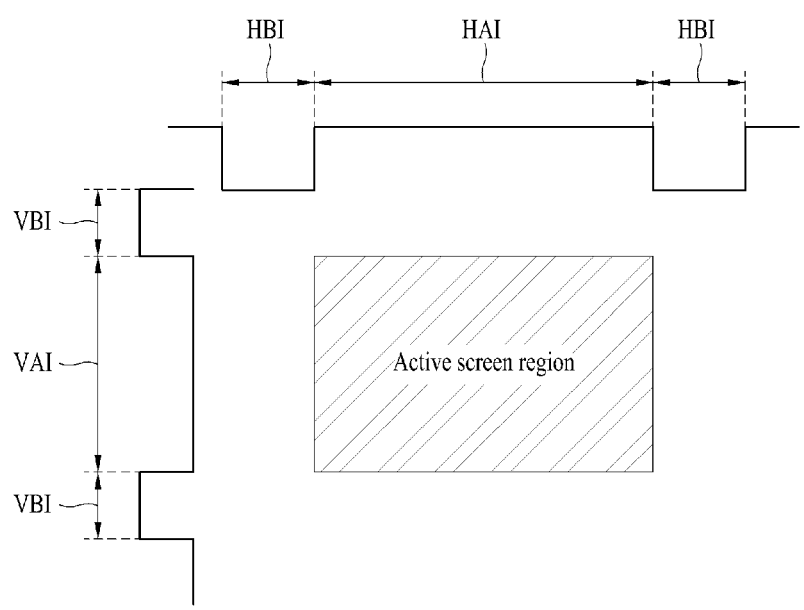
FIG. 5 is a diagram of a vertical blanking interval of a video signal.

FIG. 5 is a diagram of a vertical blanking interval of a video signal.

Referring to FIG. 5, a horizontal blanking interval and a vertical blanking interval exist in every frame of a video signal.

In particular, video information does not exist in the horizontal blanking interval and the vertical blanking interval but exists in a horizontal active interval and a vertical active interval, whereby an active screen region is implemented.

In the vertical blanking interval, various additional informations (e.g., caption information, subtitle information, copy prevention information, sound-multiplex information, etc.) may be included.

In the vertical blanking interval of the video signal, at least one of a location information of a cursor and an image information of a cursor can be included.

In particular, the controller of the present invention can control at least one of a location information of a cursor and an image information of a cursor to be transmitted on a first path, through which a video signal is transmitted, in accordance with a transmission mode in a manner of being included in a vertical blanking interval of a video signal.

In some cases, the controller can determine whether to transmit the location information of the cursor and the image information of the cursor depending on an additional information size transmitted in the vertical blanking interval of the video signal.

For instance, the controller determines the additional information size transmitted in the vertical blanking interval of the video signal. If the controller determines that the additional information size is smaller than a first reference size, the controller can control both of the location information of the cursor and the image information of the cursor to be transmitted on the first path in a manner of being included in the vertical blanking interval.

If the controller determines that the additional information size is greater than the first reference size but smaller than a second reference size, the controller can control the location information of the cursor to be transmitted on the first path in a manner of being included in the vertical blanking interval only and is also able to control the image information of the cursor to be transmitted on a second path for transmitting an OSD signal.

If the controller determines that the additional information size is greater than the second reference size, the controller can control the location information of the cursor and the image information of the cursor to be transmitted on the second path for transmitting the OSD signal without controlling both of the location information of the cursor and the image information of the cursor to be transmitted on the first path in a manner of being included in the vertical blanking interval.

The location information of the cursor and the image information of the cursor, which are transmitted on the first path, can be transmitted at the same frequency of the video signal transmitted on the first path.

For instance, a transmission frequency of the location and image informations of the cursor transmitted on the first path may be higher than that of the OSD signal transmitted on the second path.

In particular, the transmission frequency of the location and image informations of the cursor transmitted on the first path may be about 1.1~2 times higher than that of the OSD signal transmitted on the second path.

Thus, the present invention increases a transmission frequency of a cursor by a transmission frequency of a video signal without system change or extension in a manner of transmitting a location information of a cursor and an image information of a cursor through a first path on which the video signal is transmitted, thereby providing user convenience without a cost rise.

Moreover, the present invention provides a cursor displayed on a wide screen with natural and smooth motion so as to fit a multimedia device having a wide screen.

Figure 6A:
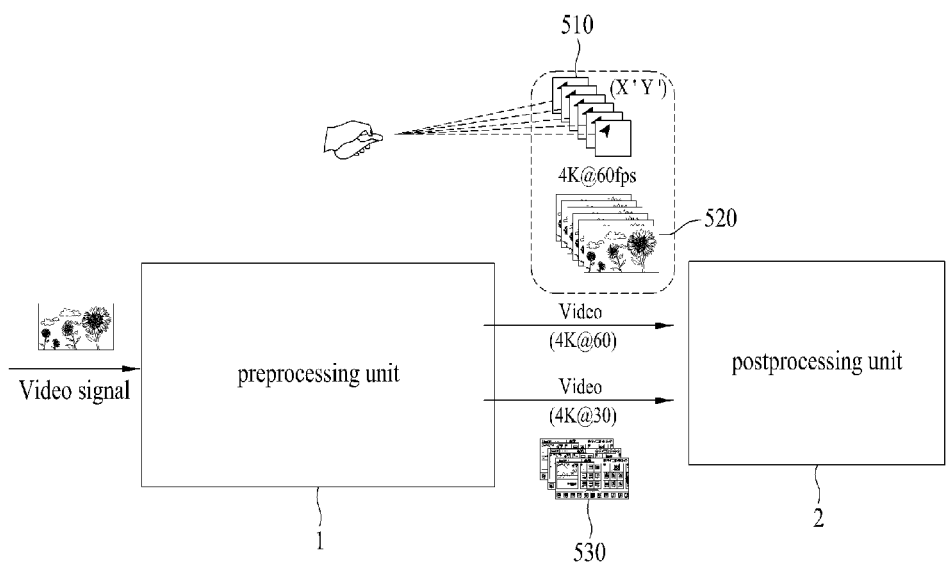
FIGS. 6A to 6C are diagrams to describe a cursor information transmitting method.
Figure 6B:
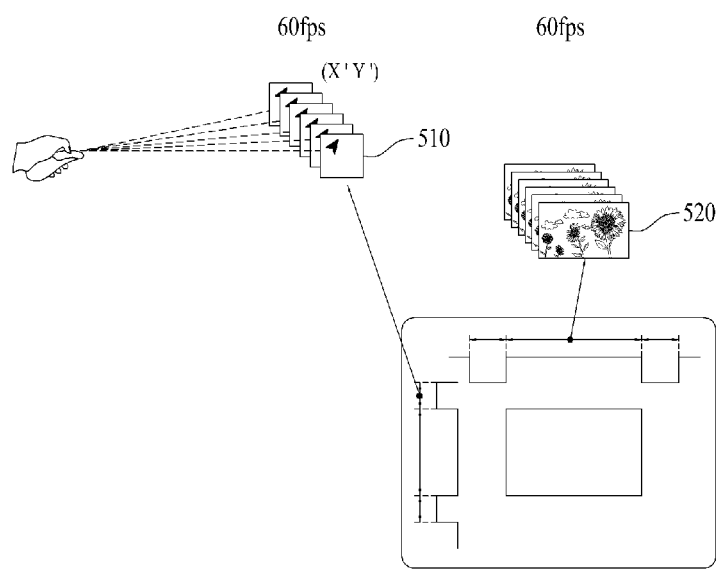
Figure 6C:
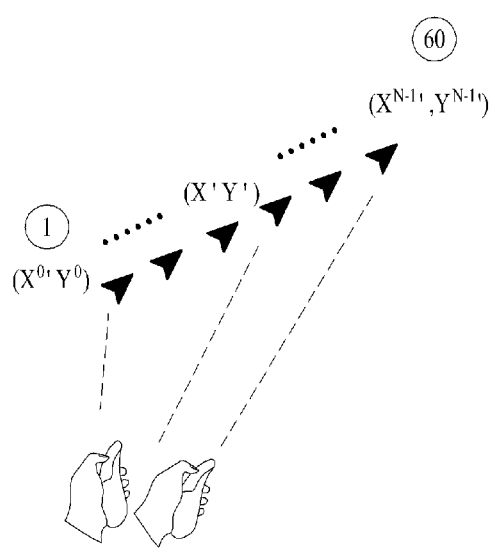

FIGS. 6A to 6C are diagrams to describe a cursor information transmitting method.

Referring to FIG. 6A, a multimedia device according to the present invention may include a preprocessing unit 1 and a postprocessing unit 2. The preprocessing unit 1 may include a main SOC (System on Chip) of a multimedia device and the postprocessing unit 2 may include an FRC (Frame Rate Conversion) chip of the multimedia device, by which the present invention is non-limited.

For instance, the postprocessing unit 1 may include a demultiplexer, a video processor, an audio processor, an OSD processor, a controller and the like, which may be removed in part in accordance with design.

The video processor may include a decoder, a scaler and a multiplexer. And, the OSD processor may include a cursor generator and an OSD generator.

The postprocessing unit 2 may include a mixer, a frame rate converter and a formatter, which may be removed in part in accordance with design.

For instance, the preprocessing unit 1 processes a received video signal and then transmits the processed video signal 520 to the postprocessing unit 2 on a first path. The preprocessing unit 1 can transmit a generated OSD signal 530 to the postprocessing unit 2 on a second path.

In doing so, a transmission frequency of the video signal 520 transmitted on the first path may be higher than that of the OSD signal 530 transmitted on the second path.

In particular, the transmission frequency of the video signal 520 transmitted on the first path may be about 1.1~2 times higher than that of the OSD signal 530 transmitted on the second path.

For instance, the transmission frequency of the video signal 520 transmitted on the first path may include 4K@60 Hz. And, the transmission frequency of the OSD signal 530 transmitted on the second path may include 4K@30 Hz.

If a cursor display signal is received from a remote control device, the preprocessing unit 1 generates a location information and an image information of a cursor in accordance with the received cursor display signal and is then able to control a cursor signal 510 including the location and image informations of the cursor to be transmitted on the first path for transmitting the video signal in a manner of being embedded in the video signal.

In doing so, a transmission frequency of the cursor signal 510 transmitted on the first path may be higher than that of the OSD signal 530 transmitted on the second path.

In particular, the transmission frequency of the cursor signal 510 transmitted on the first path may be about 1.1~2 times higher than that of the OSD signal 530 transmitted on the second path.

Moreover, the transmission frequency of the cursor signal 510 transmitted on the first path may be equal to that of the video signal 520 transmitted on the first path.

For instance, the transmission frequency of the cursor signal 510 transmitted on the first path may include 4K@60 Hz. And, the transmission frequency of the OSD signal 530 transmitted on the second path may include 4K@30 Hz.

In some cases, the cursor signal 510 including the location information of the cursor may be transmitted on the first path for transmitting the video signal in a manner of being embedded in the video signal 520 and the cursor signal 510 including the image information of the cursor may be transmitted on the second path for transmitting the OSD signal in a manner of being embedded in the OSD signal 530.

For instance, the transmission frequency of the cursor signal 510 transmitted on the first path by including the location information of the cursor may include 4K@60 Hz. And, the transmission frequency of the cursor signal 510 transmitted on the second path by including the image information of the cursor may include 4K@30 Hz.

Thus, the location information of the cursor is transmitted on the first path and the image information of the cursor is transmitted on the second path. The reason for this is described as follows. First of all, since the location information of the cursor changes fast, it has to be transmitted at a high frequency. Yet, since the image information of the cursor barely changes, it can be transmitted at a low frequency.

Meanwhile, the location and image informations of the cursor transmitted on the first path can be transmitted in the vertical blanking interval of the video signal.

Referring to FIG. 6B, the cursor signal 510 transmitted on the first path may be transmitted in the vertical blanking interval of the video signal, while the video signal 520 may be transmitted in the horizontal blanking interval.

In doing so, in the vertical blanking interval of the video signal, the cursor signal 510 including at least one of the location information of the cursor and the image information of the cursor can be transmitted.

And, in the vertical blanking interval, various additional informations (e.g., caption information, subtitle information, copy prevention information, sound-multiplex information, etc.) may be included.

For instance, the transmission frequency of the cursor signal 510 transmitted in the vertical blanking interval may be equal to that of the video signal 520 transmitted in the horizontal blanking interval.

Thus, if the cursor signal 510 is transmitted to the postprocessing unit 2 on the first path, the postprocessing unit 2 can display the image information of the cursor based on the location information of the cursor transmitted on the first path.

Referring to FIG. 6C, a cursor displayed on a display unit can move on the screen along a route on which a user's input device moves.

In doing so, when a location information of the cursor, which includes moving coordinates, is transmitted at about 60 Hz, the cursor is displayed to correspond to it, a movement of the cursor is smooth.

Figure 7A:
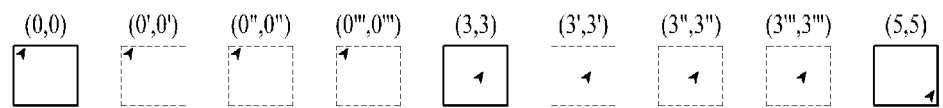
FIG. 7A and FIG. 7B are diagrams to illustrate movements of a cursor in response to a frame rate change of a cursor signal.
Figure 7B:
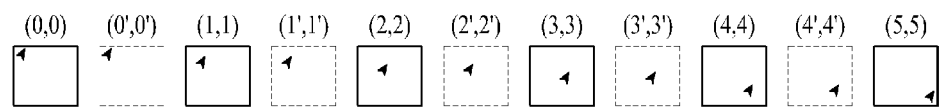

FIG. 7A and FIG. 7B are diagrams to illustrate movements of a cursor in response to a frame rate conversion of a cursor signal. In particular, FIG. 7A is a diagram of a movement of a cursor in response to converting a frame rate to 120 Hz from 30 Hz. And, FIG. 7B is a diagram of a movement of a cursor in response to converting a frame rate into 120 Hz from 60 Hz.

Referring to FIG. 7A, if a postprocessing unit converts a cursor transmitted at 30 Hz to a frame of 120 Hz, a movement of the cursor is unsmooth as well as unnatural, inconvenience may be caused to a user.

Yet, referring to FIG. 7B, if a postprocessing unit converts a cursor transmitted at 60 Hz to a frame of 120 Hz, a movement of the cursor becomes natural and smooth, it can provide a user with convenience and is suitable for a multimedia device having a wide screen.

Since the present invention transmits a cursor signal through a first path, on which a video signal is transmitted, at the same frequency of the video signal, a movement of a cursor can be displayed smoothly and naturally. Therefore, the present invention provides a user with convenience and is usable to fit for a multimedia device having a wide screen.

Figure 8B:
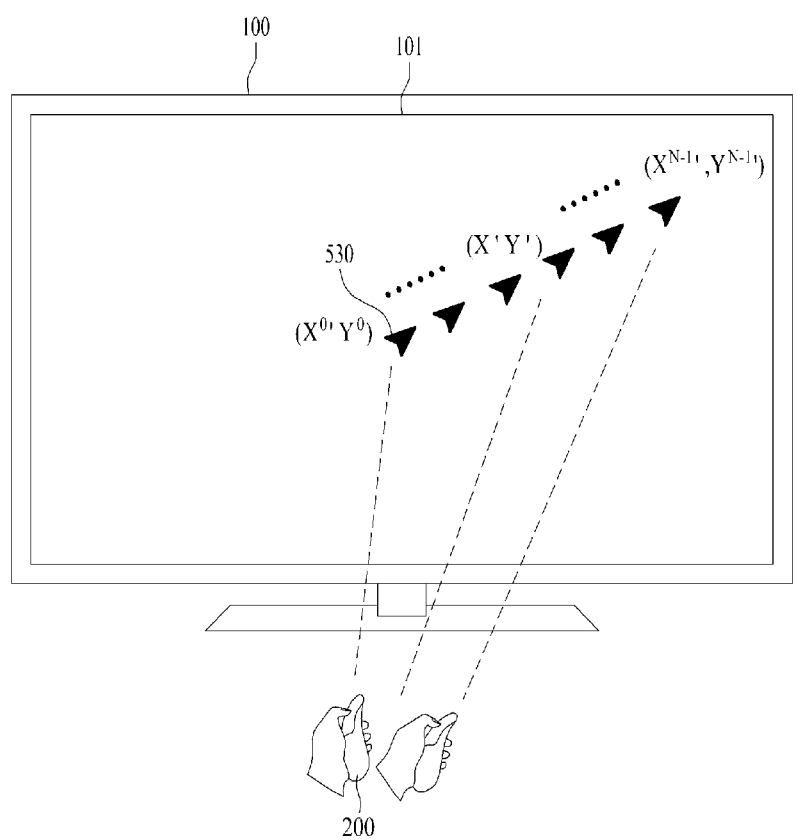

FIG. 8A and FIG. 8B are diagrams to illustrate movements of a cursor displayed on a display screen.

Referring to FIG. 8A, if a user transmits a cursor display signal through a remote control device 200, a multimedia device 100 generates a location information of a cursor and an image information of the cursor in accordance with the received cursor display signal, transmits the generated location information of the cursor and the generated image information of the cursor in a manner that the location information of the cursor and the image information of the cursor are embedded in a video signal, and is able to display the image information of the cursor on a display screen 101 based on the location information of the cursor embedded in the video signal.

In doing so, if the cursor display signal is received, the multimedia device 100 can extract basic values preset for a location and image of the cursor.

In this case, the basic value preset for the location of the cursor may include a value for a cursor 530 to be located at a center of the screen 101 on which a video is displayed.

Hence, if an initial cursor display signal is received, the cursor 530 can be displayed on the display screen 101 in accordance with the basic value preset for the location of the cursor.

For instance, if the basic value for the location of the cursor is a coordinate value located at the center of the display screen 101, the cursor 530 can be displayed at the center of the display screen 101.

Subsequently, referring to FIG. 8B, if the user's remote control device 200 is moved, the multimedia device 100 calculates a location value of the cursor corresponding to a change of a received cursor display signal value and is then able to move the cursor 530 on the display screen 101.

In this case, the cursor display signal value may include at least one of a size value of amount of light incident from the remote control device or a value of coordinates of a light image.

Hence, the multimedia device 100 can transmit a cursor signal including the location information of the cursor at a transmission frequency of a video signal through a first path, on which the video signal is transmitted, in a manner that the cursor signal is embedded in the video signal.

In this case, the location information of the cursor transmitted through the first path can be transmitted in a vertical blanking interval of the video signal.

And, the multimedia device 100 can display the image information of the cursor on the display screen 101 based on the location information of the cursor embedded in the video signal.

Therefore, the cursor 530 displayed on the display screen 101 can move naturally and smoothly on the screen 101 along a moving route of the remote control device 200 of the user.

Figure 9:
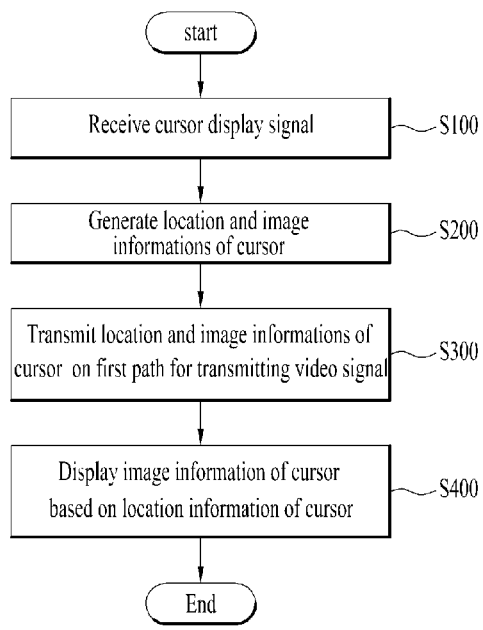
FIG. 9 and FIG. 10 are flowcharts for a method of controlling a cursor of a multimedia device according to a first embodiment of the present invention.
Figure 10:
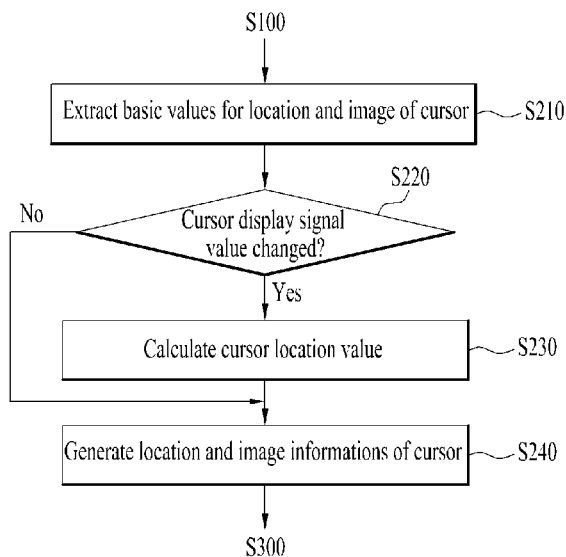

FIG. 9 and FIG. 10 are flowcharts for a method of controlling a cursor of a multimedia device according to a first embodiment of the present invention.

Referring to FIG. 9 and FIG. 10, a multimedia device receives a cursor display signal from a user's remote control device [S100].

Subsequently, the multimedia device generates a location information of a cursor and an image information of the cursor in accordance with the received cursor display signal [S200].

In doing so, when the multimedia device generates the location information of the cursor and the image information of the cursor, if the cursor display signal is received, the multimedia device can extract basic values preset for a location and image of the cursor from a storage unit [S210].

In this case, the basic value preset for the location of the cursor may include a coordinate value located at a center of a screen on which a video is displayed.

Subsequently, the multimedia device can check whether a value of the received cursor display signal is changed in response to a movement of the remote control device [S220].

In this case, the cursor display signal value may include a size value of amount of light incident from the remote control device or a value of coordinates of a light image.

If the cursor display signal value changes, the multimedia device calculates a location value of the cursor corresponding to the changed cursor display signal [S230].

The multimedia device is then able to generate a location information on the calculated location value of the cursor and an image information on the extracted basic value of the image [S240].

After the multimedia device has generated the location information and the image information of the cursor, the multimedia device can transmit the generated location information of the cursor on a first path for transmitting a video signal in a manner that the generated location information is embedded in the video signal [S300].

Moreover, the multimedia device may be able to transmit the generated image information of the cursor in a manner that the generated image information is embedded in a video signal or an OSD signal.

In this case, the location and image informations of the cursor embedded in the video signal may be transmitted at the same frequency of the video signal transmitted on the first path.

In some cases, the location and image informations of the cursor embedded in the video signal may be transmitted at a frequency different from that of the OSD signal transmitted on a second path.

In particular, a transmission frequency of the location and image informations of the cursor embedded in the video signal may be higher than that of the OSD signal transmitted on the second path.

For instance, the transmission frequency of the location and image informations of the cursor transmitted on the first path by being embedded in the video signal may be about 1.1~2 times higher than that of the OSD signal transmitted on the second path.

The location and image informations of the cursor embedded in the video signal may be transmitted in a manner of being embedded in a vertical blanking interval of the video signal.

Finally, the multimedia device can display the image information of the cursor on the display screen based on the location information of the cursor embedded in the video signal [S400].

Figure 11:
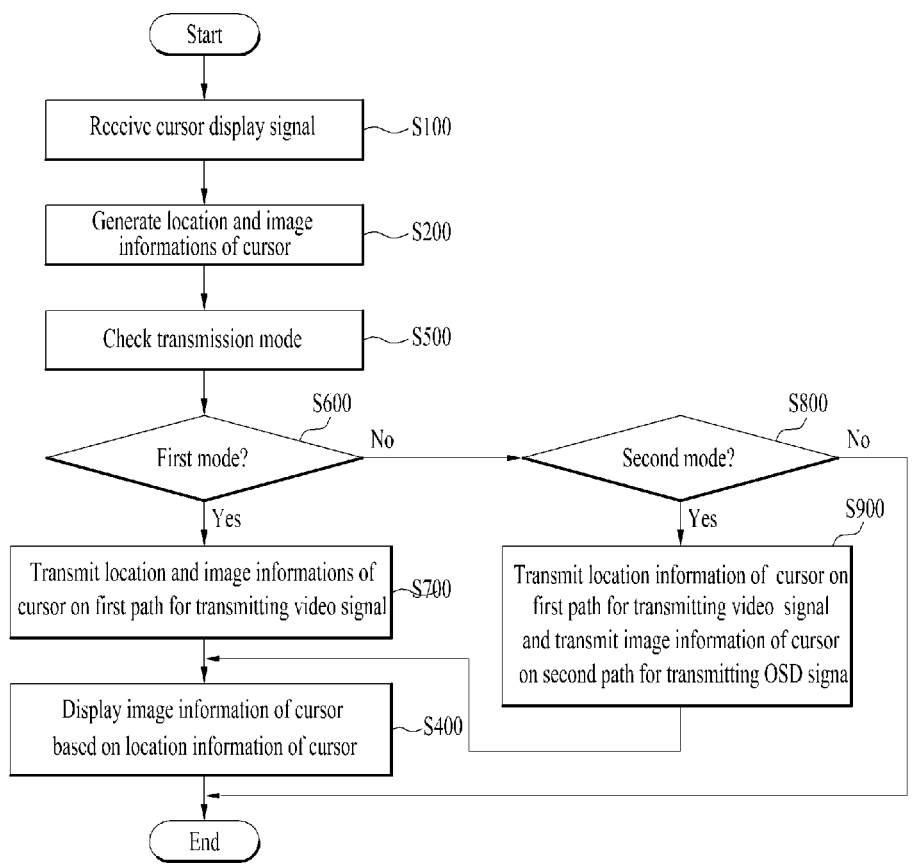
FIG. 11 is a flowchart for a method of controlling a cursor of a multimedia device according to a second embodiment of the present invention.

FIG. 11 is a flowchart for a method of controlling a cursor of a multimedia device according to a second embodiment of the present invention.

Referring to FIG. 11, a multimedia device receives a cursor display signal from a user's remote control device [S100].

Subsequently, the multimedia device generates a location information of a cursor and an image information of the cursor in accordance with the received cursor display signal [S200].

The multimedia device then checks a transmission mode of the location and image informations of the cursor [S500].

In this case, the transmission mode may be set to default in advance or may be set in response to an additional information size transmitted in a vertical blanking interval of a video signal.

For instance, the multimedia device determines the additional information size transmitted in the vertical blanking interval of the video signal. If the multimedia device determines that the additional information size is smaller than a first reference size, the multimedia device can control both of the location information of the cursor and the image information of the cursor to be transmitted on the first path in a manner of being included in the vertical blanking interval.

If the multimedia device determines that the additional information size is greater than the first reference size but smaller than a second reference size, the multimedia device can control the location information of the cursor to be transmitted on the first path in a manner of being included in the vertical blanking interval only and is also able to control the image information of the cursor to be transmitted on a second path for transmitting an OSD signal.

If the multimedia device determines that the additional information size is greater than the second reference size, the multimedia device can control the location information of the cursor and the image information of the cursor to be transmitted on the second path for transmitting the OSD signal without controlling both of the location information of the cursor and the image information of the cursor to be transmitted on the first path in a manner of being included in the vertical blanking interval.

Subsequently, the multimedia device checks whether the confirmed transmission mode is set to a first mode [S600].

If the transmission mode is set to the first mode, the multimedia device can control the location information of the cursor and the image information of the cursor to be transmitted through the first path, on which the video signal is transmitted, in a manner of being embedded in the video signal [S700].

In this case, the location and image informations of the cursor embedded in the video signal may be transmitted at the same frequency of the video signal transmitted on the first path.

In some cases, the location and image informations of the cursor embedded in the video signal may be transmitted at a frequency different from that of the OSD signal transmitted on a second path.

In particular, a transmission frequency of the location and image informations of the cursor transmitted on the first path may be higher than that of the OSD signal transmitted on the second path.

For instance, the transmission frequency of the location and image informations of the cursor transmitted on the first path may be about 1.1~2 times higher than that of the OSD signal transmitted on the second path.

The location and image informations of the cursor embedded in the video signal may be transmitted on the first path in a manner of being embedded in a vertical blanking interval of the video signal.

Yet, if the transmission mode is not set to the first mode, the multimedia device checks whether the transmission mode is set to a second mode [S800].

If the transmission mode is set to the second mode, the multimedia device transmits the generated location information of the cursor on the first path for transmitting the video signal in a manner that the generated location information is embedded in the video signal and is also able to transmit the generated image information of the cursor on the second path for transmitting an OSD signal in a manner that the generated image information is embedded in the OSD signal.

In this case, the location information of the cursor transmitted on the first path by being embedded in the video signal may be transmitted at a first frequency and the image information of the cursor transmitted on the second path by being embedded in the OSD signal may be transmitted at a second frequency lower than the first frequency.

For instance, the first frequency may be about 1.1~2 times higher than the second frequency.

And, the location information of the cursor embedded in the video signal can be transmitted in a manner of being embedded in the vertical blanking interval of the video signal.

Finally, the multimedia device can display the image information of the cursor on the display screen based on the location information of the cursor embedded in the video signal [S400].

Figure 12:
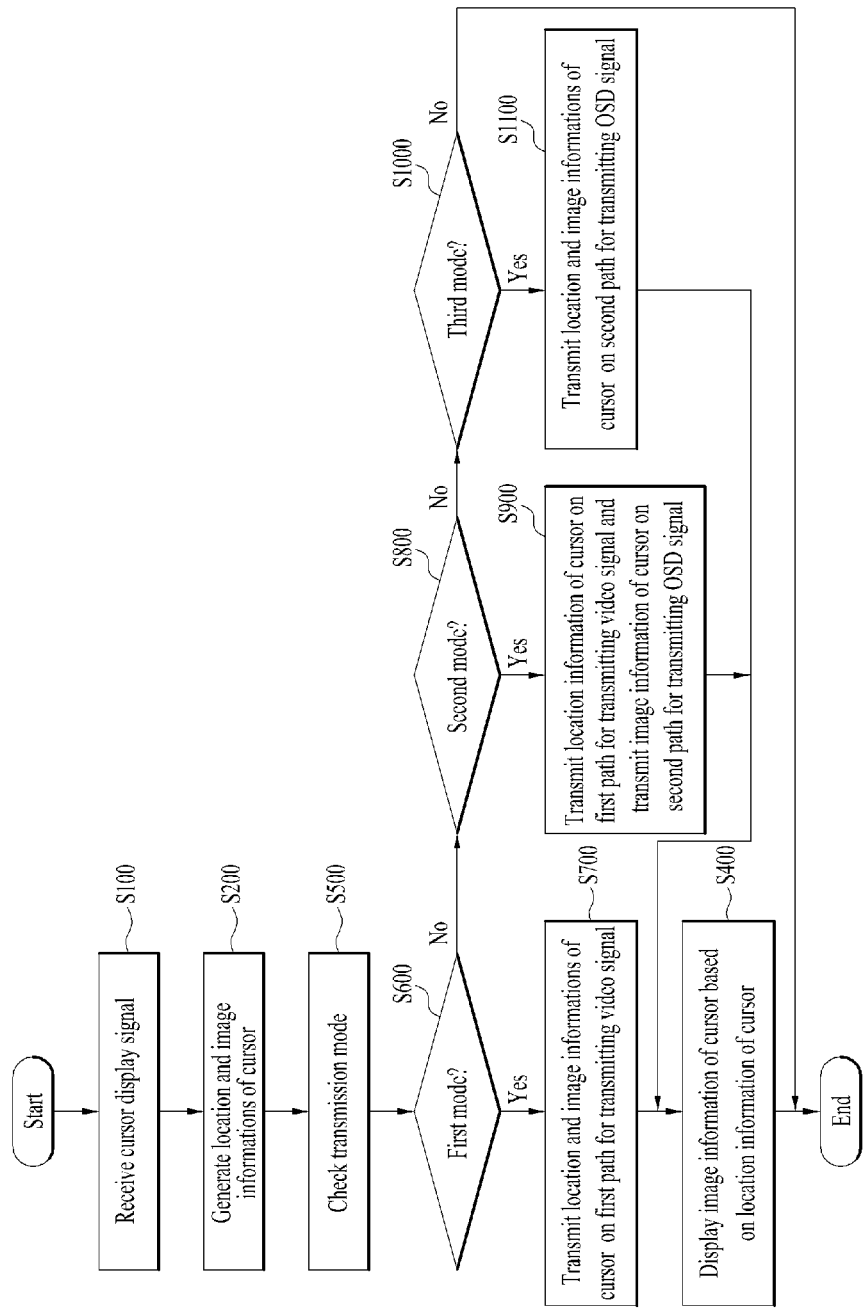
FIG. 12 is a flowchart for a method of controlling a cursor of a multimedia device according to a third embodiment of the present invention.

FIG. 12 is a flowchart for a method of controlling a cursor of a multimedia device according to a third embodiment of the present invention.

Referring to FIG. 12, a multimedia device receives a cursor display signal from a user's remote control device [S100].

Subsequently, the multimedia device generates a location information of a cursor and an image information of the cursor in accordance with the received cursor display signal [S200].

The multimedia device then checks a transmission mode of the location and image informations of the cursor [S500].

In this case, the transmission mode may be set to default in advance or may be set in response to an additional information size transmitted in a vertical blanking interval of a video signal.

For instance, the multimedia device checks the additional information size transmitted in the vertical blanking interval of the video signal. If the multimedia device determines that the additional information size is smaller than a first reference size, the multimedia device can control both of the location information of the cursor and the image information of the cursor to be transmitted on the first path in a manner of being included in the vertical blanking interval.

If the multimedia device determines that the additional information size is greater than the first reference size but smaller than a second reference size, the multimedia device can control the location information of the cursor to be transmitted on the first path in a manner of being included in the vertical blanking interval only and is also able to control the image information of the cursor to be transmitted on a second path for transmitting an OSD signal.

If the multimedia device determines that the additional information size is greater than the second reference size, the multimedia device can control the location information of the cursor and the image information of the cursor to be transmitted on the second path for transmitting the OSD signal without controlling both of the location information of the cursor and the image information of the cursor to be transmitted on the first path in a manner of being included in the vertical blanking interval.

Subsequently, the multimedia device checks whether the confirmed transmission mode is set to a first mode [S600].

If the transmission mode is set to the first mode, the multimedia device can control the location information of the cursor and the image information of the cursor to be transmitted through the first path, on which the video signal is transmitted, in a manner of being embedded in the video signal [S700].

In this case, the location and image informations of the cursor embedded in the video signal may be transmitted at the same frequency of the video signal transmitted on the first path.

In some cases, the location and image informations of the cursor transmitted on the first path may be transmitted at a frequency different from that of the OSD signal transmitted on a second path.

In particular, a transmission frequency of the location and image informations of the cursor transmitted on the first path may be higher than that of the OSD signal transmitted on the second path.

For instance, the transmission frequency of the location and image informations of the cursor transmitted on the first path may be about 1.1~2 times higher than that of the OSD signal transmitted on the second path.

The location and image informations of the cursor embedded in the video signal may be transmitted in a manner of being embedded in a vertical blanking interval of the video signal.

Yet, if the transmission mode is not set to the first mode, the multimedia device checks whether the transmission mode is set to a second mode [S800].

If the transmission mode is set to the second mode, the multimedia device transmits the generated location information of the cursor on the first path for transmitting the video signal in a manner that the generated location information is embedded in the video signal and is also able to transmit the generated image information of the cursor on the second path for transmitting an OSD signal in a manner that the generated image information is embedded in the OSD signal [S900].

In this case, the location information of the cursor embedded in the video signal may be transmitted at a first frequency and the image information of the cursor embedded in the OSD signal may be transmitted at a second frequency lower than the first frequency.

For instance, the first frequency may be about 1.1~2 times higher than the second frequency.

And, the location information of the cursor embedded in the video signal can be transmitted in a manner of being embedded in the vertical blanking interval of the video signal.

Yet, if the transmission mode is not set to the second mode [S100], the multimedia device checks whether the transmission mode is set to a third mode [S1000].

If the transmission mode is set to the third mode, the multimedia device can transmit the generated location and image informations of the cursor on the second path for transmitting the OSD signal in a manner that the generated the location and image informations of the cursor are embedded in the OSD signal [S1100].

Finally, the multimedia device can display the image information of the cursor on the display screen based on the location information of the cursor embedded in the video signal [S400].

Accordingly, the present invention provides the following effects and/or advantages.

First of all, the present invention enhances user convenience without a cost rise in a manner of increasing a frequency of a cursor without system reconfiguration or extension.

Secondly, the present invention provides to a cursor displayed on a wide screen with natural and smooth movement, thereby fitting to a multimedia device having a wide screen.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. In displaying a video including On-Screen Display OSD data by mixing a video signal and an OSD signal together, a method of controlling a cursor of a multimedia device, comprising:
   receiving a cursor display signal from an input device;
   generating a location information of a cursor and an image information of the cursor in accordance with the received cursor display signal;
   checking a transmission mode of the generated location and image informations of the cursor;
   when the checked transmission mode is a first mode, transmitting the generated location and image informations of the cursor in a manner of embedding the generated location and image informations of the cursor in the video signal; and
   displaying the image information of the cursor based on the location information of the cursor embedded in the video signal.

2. The method of claim 1, the generating of the location and image informations of the cursor, comprising:
   when the cursor display signal is received, extracting basic values preset for a location and image of the cursor;
   checking whether a value of the received cursor display signal is changed in response to a movement of the input device;
   when the cursor display signal value is changed, calculating a location value of the cursor corresponding to the changed cursor display signal value; and
   generating the location information on the calculated location value of the cursor and the image information on the extracted basic value of the image.

3. The method of claim 2, wherein the checking of whether the value of the received cursor display signal is changed, the cursor display signal value comprises at least one of a size value of amount of light incident from the input device and a coordinate value of a light image.

4. The method of claim 2, wherein the basic value preset for the location of the cursor comprises a coordinate value located at a center of a display screen having the video displayed thereon.

5. The method of claim 1, wherein the checking of the transmission mode of the location and image informations of the cursor includes setting the transmission mode to default in advance or in response to an additional information size transmitted in a vertical blanking interval of the video signal.

6. The method of claim 1, wherein the transmitting of the generated location and image informations comprises:
   when the transmission mode is not the first mode, checking whether the transmission mode is a second mode; and
   when the transmission mode is the second mode, transmitting the generated location information of the cursor and the generated image information of the cursor in a manner that the generated location information of the cursor and the generated image information of the cursor are embedded in the video signal and the OSD signal, respectively.

7. The method of claim 6, wherein when the transmission mode is not the second mode, the generated location and image informations of the cursor are transmitted in a manner of being embedded in the OSD signal.

8. The method of claim 6, wherein the location information of the cursor embedded in the video signal is transmitted at a first frequency, and wherein the image information of the cursor embedded in the OSD signal is transmitted at a second frequency lower than the first frequency.

9. The method of claim 8, wherein the first frequency is about 1.1~2 times higher than the second frequency.

10. The method of claim 1, wherein the location and image informations of the cursor embedded in the video signal is transmitted at a frequency higher than that of the OSD signal.

11. The method of claim 10, wherein the transmission frequency of the location and image informations of the cursor embedded in the video signal is about 1.1~2 times higher than the transmission frequency of the OSD signal.

12. The method of claim 1, wherein the location and image informations of the cursor embedded in the video signal are embedded in a vertical blanking interval of the video signal.

13. In displaying a video including On-Screen Display OSD data by mixing a video signal and an OSD signal together, a multimedia device comprising:
- a receiving unit configured to receive a cursor display signal from an input device;
- a cursor generating unit configured to generate a location information of a cursor and an image information of the cursor in accordance with the received cursor display signal;
- a control unit configured to control the generated location information of the cursor to be transmitted in a manner of being embedded in the video signal; and
- a display unit configured to display the image information of the cursor based on the location information of the cursor embedded in the video signal,
- wherein the control unit is configured to check a transmission mode of the generated location and image informations of the cursor,
- wherein when the checked transmission mode is a first mode, the control unit is configured to transmit the generated location and image informations of the cursor in a manner of embedding the generated location and image informations of the cursor in the video signal, and
- wherein when the checked transmission mode is a second mode, the control unit is configured to transmit the generated location information of the cursor and the generated image information of the cursor in a manner that the generated location information of the cursor and the generated image information of the cursor are embedded in the video signal and the OSD signal, respectively.

14. The multimedia device of claim 13, the cursor generating unit comprising:
- a cursor information extracting unit configured to extract basic values preset for a location and image of the cursor when the cursor display signal is received;
- a cursor location calculating unit configured to calculate a location value of the cursor corresponding to the changed cursor display signal value when a value of the received cursor display signal is changed; and
- a transmitting unit configured to transmit the location information on the calculated location value of the cursor and the image information on the extracted basic value of the image in response to a control signal of the control unit.

15. The multimedia device of claim 13, wherein when the transmission mode is not the second mode, the control unit is configured to transmit the generated location and image informations of the cursor in a manner of embedding the generated location and image informations of the cursor in the OSD signal.

16. The multimedia device of claim 13, wherein the control unit controls the location information of the cursor embedded in the video signal to be transmitted in a manner of being embedded in a vertical blanking interval of the video signal.

17. The multimedia device of claim 13, wherein the location and image informations of the cursor embedded in the video signal is transmitted at a frequency higher than that of the OSD signal.

* * * * *